United States Patent [19]

Kovar et al.

[11] 4,353,428

[45] Oct. 12, 1982

[54] SUSPENSION OF VEHICLES FOR RUGGED TERRAIN

[75] Inventors: Josef Kovar; Milos Suchy, both of Praha, Czechoslovakia

[73] Assignee: Ustav pro vyzkum motorvych vozidel, Praha, Czechoslovakia

[21] Appl. No.: 129,220

[22] Filed: Mar. 11, 1980

[51] Int. Cl.³ .............................................. B62D 57/00
[52] U.S. Cl. .................................. 180/7 R; 280/5.28; 301/1
[58] Field of Search .................. 180/7 R, 8 A, 74; 280/5.2, 5.28; 301/1, 5 R, 127; 16/18 A; 280/DIG. 10

[56] References Cited

U.S. PATENT DOCUMENTS

| | | | |
|---|---|---|---|
| 3,084,950 | 4/1963 | Rass | 280/5.2 X |
| 3,424,259 | 1/1969 | Aghnides | 180/7 R |
| 3,695,375 | 10/1972 | Splawinski | 180/74 X |
| 3,700,254 | 10/1972 | Eck | 301/127 X |
| 3,861,435 | 1/1975 | Vincent et al. | 180/7 R |

FOREIGN PATENT DOCUMENTS

| | | | |
|---|---|---|---|
| 248451 | 11/1963 | Australia | 16/18 A |
| 977689 | 11/1975 | Canada | 180/7 R |
| 2235809 | 1/1975 | France | 301/127 |
| 1855 | of 1856 | United Kingdom | 16/18 A |

(Addition to No. 2644)

OTHER PUBLICATIONS

German Printed Application, Apparate–u. Maschinenbau, G.m.b.H., A18533 XI/65a¹, 7/56.

*Primary Examiner*—John A. Pekar

[57] ABSTRACT

The invention relates to the suspension of a vehicle for rugged terrain with a wheel or wheel-like ground engaging element, the ground-engaging surface of which has the shape of a body of revolution and which is journalled for free rotation on a primary axle, the primary axle being freely rotatable around a second axle which is connected with the frame of the vehicle. The secondary and primary axles make an angle $\alpha$ with respect to each other which is less than 90°. Also with respect to a reference plane $\tau$, perpendicular to a horizontal support plane and passing through the longitudinal axis of the vehicle at least one of said axles making an angle $\beta$ with the plane $\tau$ which is less than 90°. The suspension according to this invention is a simple design and no additional control device is required for the adjustment of the travel gear when overcoming obstacles. The suspension may be used to advantage on vehicles which are power driven, as well as on vehicles which are not power driven and which are either pushed or towed.

4 Claims, 16 Drawing Figures

SUSPENSION OF VEHICLES FOR RUGGED TERRAIN

BACKGROUND OF THE INVENTION

The invention relates to the suspension of a vehicle for rugged terrain with a wheel or wheel-like ground engaging element, the ground-engaging surface of which has the shape of a body of revolution and which is journalled on a primary axle, the primary axle being freely rotatable around a secondary axle which is connected with the frame of the vehicle.

Different travel gears with track chains or wheels, sometimes with their combinations, have been used with actually known vehicles for rugged terrain in order to improve their riding characteristics. These travel gears, however, meet requirements from the point of view of the possibility of passage over rugged terrain to a limited degree only, and their manufacturing costs are relatively high. Travel gears comprising cylindrical bodies with axes parallel with the longitudinal axis of the vehicle and provided on their peripheries with a helix do not allow the vehicle to achieve higher speeds on even ground. In other travel gears provided with so-called walking mechanisms, problems arise with the control and with the stability of the vehicles.

Known small vehicles, for instance power driven minicars for invalids, or man powered vehicles such as wheel chairs, used for overcoming rugged terrain, particularly steps and similar obstacles, employ in addition to a common travel gear another gear acting solely when rugged terrain has to be overcome. Such other gear includes extensible supports, tiltable shafts with helices, and the like. Their disadvantage, in addition to the complicated design of these additional gears, is the requirement of an additional control device, the operation of which is an encumbrance for those manning such a vehicle.

SUMMARY OF THE INVENTION

It is an object of this invention to provide a travel gear for the said purpose which operates smoothly, which requires no special additional control means, and which is simple in design. According to this invention, a travel gear of wheel or wheel-like shape is used, supported by a primary axle, which is freely rotatably supported by a secondary axle connected with the vehicle frame. Said secondary axle forms an acute angle with the horizontal or with a plane perpendicular to the horizontal, which plane passes through the primary axle, or it may be disposed at an acute angle with respect to both said planes. Preferably the angle between the secondary axle and the horizontal supporting plane is smaller than the angle between the primary axle and the horizontal supporting plane.

Advantages of the suspension of the travel gear are primarily its simple design, and its low manufacturing costs, since no further control means are required for the adjustment of the travel gear when obstacles have to be overcome by the vehicle.

An exemplary embodiment of a suspension of a travel gear according to this invention is illustrated in the accompanying drawings, wherein:

DETAILED DESCRIPTION

Figure 1:
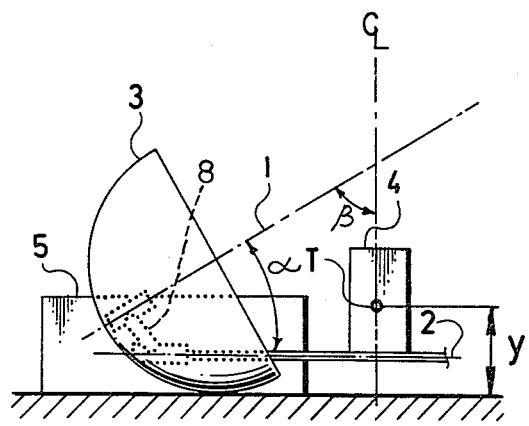
FIGS. 1, 3, 5 and 7 are views in side elevation diagrammatically illustrating different phases of the motion of the lefthand travel gear element and of the vehicle frame when overcoming an obstacle in the shape of a step.
Figure 5:
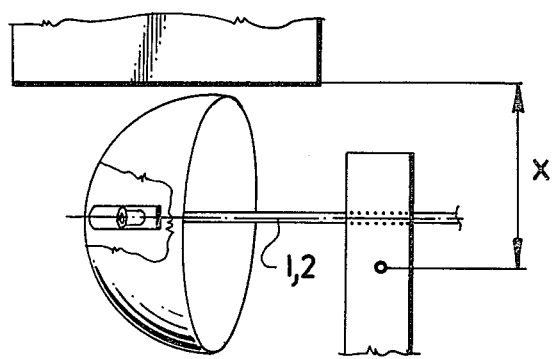
Figure 2:
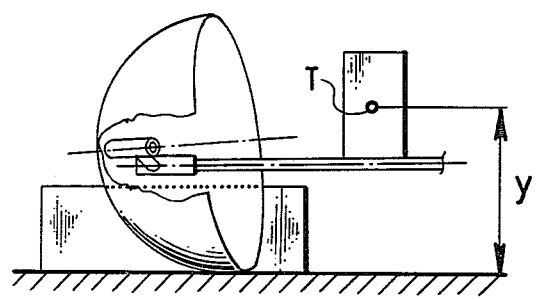
FIGS. 2, 4, 6 and 8 are top views of the phases of motion shown in FIGS. 1, 3, 5 and 7, respectively.
Figure 6:
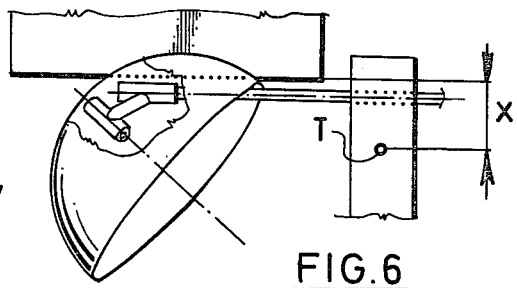

Turning first to FIGS. 1-8, inc., a wheel or wheel-like travel gear element 3 in the shape of a hemisphere is suspended on the frame for a vehicle so as to be able to rotate both around a primary axle 1, which in the apparatus shown is the axis of symmetry of the external surface of the element 3, and around a secondary axle 2. The secondary axle 2 is in this case represented diagrammatically by a stub shaft supported by the vehicle frame 4. The stub shaft upon which the travel gear element 3 is journalled is diagrammatically shown in FIG. 1 by a primary axle 1 rotatably supported about the secondary axle 2 by means of a suspension 8. The primary axle 1 and the secondary axle 2 in this case lie in a common vertical plane and are disposed at an angle with respect to each other when the vehicle is supported on a horizontal plane as shown in FIG. 1. A step 5 representing the obstacle and the center of gravity T of the vehicle frame 4, within indication of its distance y from the horizontal support and of the distance of the edge of the step 5 are shown in FIGS. 1 to 8, inclusive.

The horizontal position of the secondary axle 2 shown in FIGS. 1 to 8 inclusive holds true for a case in which the travel gear element (not shown) on the right hand side of the vehicle has to overcome the same obstacle simultaneously with the left-hand element 3 which is shown in such figures. The secondary axle 2 can be in an unchanged spatial position with respect to the vehicle frame in FIGS. 1 to 8 inclusive (and in FIG. 9, to be described). When overcoming an obstacle, only a rotation of the travel gear 3 with respect to the primary axle 1 occurs when both travel gears of the vehicle (the travel gear on the left and the travel gear on the right) simultaneously overcome the same obstacle.

Figure 9:
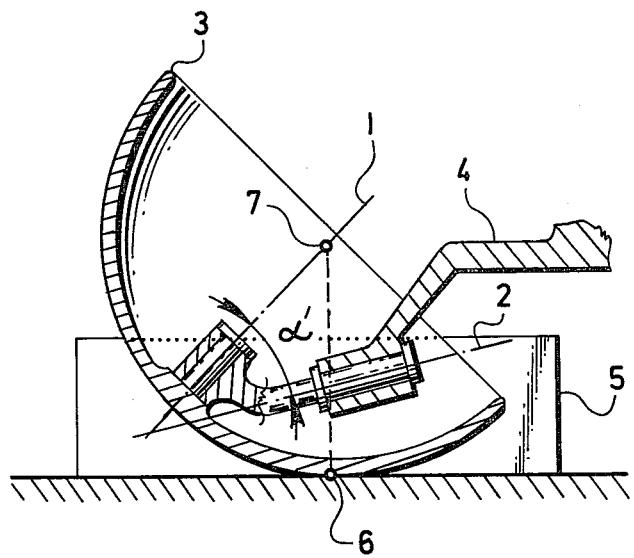
FIG. 9 is a view partly in elevation and partly in vertical section of the travel gear element of a variant of the suspension of FIGS. 1-8, inclusive in its fundamental position.

In the modification shown in FIG. 9, the arrangement of the secondary axle 2 differs from that of FIGS. 1 to 8 inclusive, and the angle $\alpha'$ between the axis of the primary axle 1 and that of the secondary axle 2 is different from the angle $\alpha$ in the arrangement of FIGS. 1 to 8 inclusive. In FIG. 9, the vehicle frame 4 is shown in its fundamental position, i.e., by moving along a horizontal support, the contact point of the travel gear element 3 with the horizontal support being indicated at 6, there being erected a vertical line through point 6. Line 6 passes through the primary axle 1 at the crossing point 7.

In both the embodiment of FIGS. 1 to 8 inclusive, on the one hand and that of FIG. 9 on the other, the angles $\alpha$ and $\alpha'$, respectively, lie within the range between 0° and 45° ($0° < \alpha \leq 45°$). It is to be understood that the angle $\alpha$ and $\alpha'$ between the axles 1 and 2 is determined from the crossing point of the axes of axles 1 and 2. The angles $\alpha$ and $\alpha'$ between the axes of the secondary axle 2 and the horizontal supporting plane is smaller than the angle between the axes of the primary axle 1 and the horizontal supporting plane.

Figure 10:
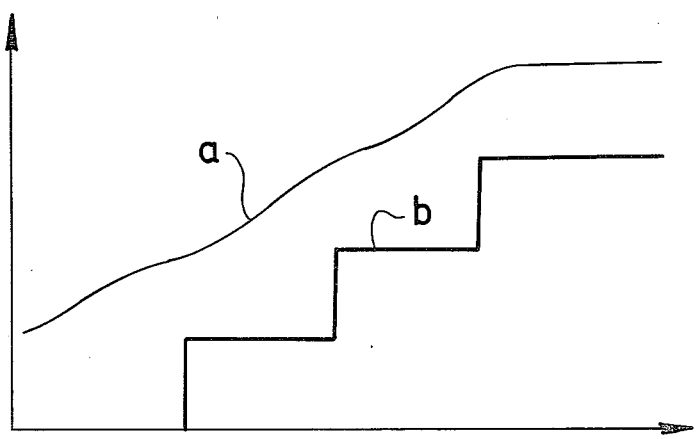
FIG. 10 is a diagram showing vertical and horizontal movement of the vehicle frame when the vehicle is overcoming an obstacle such as a set of stairs.

The diagram in FIG. 10 indicates in rectangular coordinates both a set of stairs b representing a set-up vehicle path, along which the vehicle with the travel gear according to this invention is assumed to move, and a curve a indicating the trace of the center of gravity T of the vehicle when overcoming the stepped-up track b.

Figure 3:
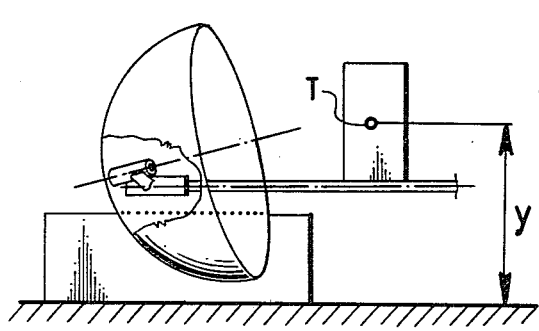
Figure 7:
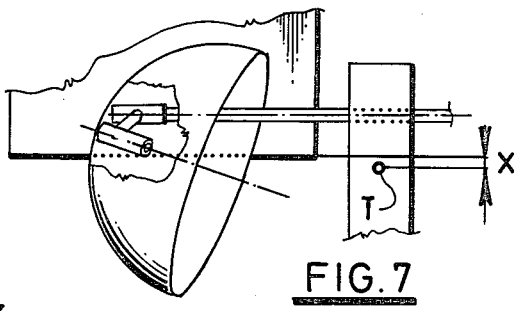
Figure 4:
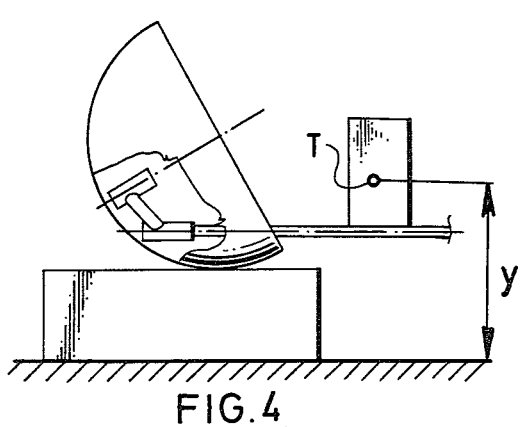
Figure 8:
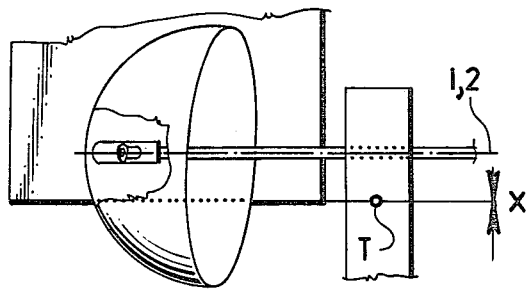

During the course of movement of the vehicle along a horizontal plane, the primary axle 1 and the secondary axle 2 are in a vertical plane and the contact point 6 (FIGS. 1 and 2), is on the crossing line with the horizontal support. In case of contact of the travel gear element 3 with the edge of a step 5, the travel gear element 3 starts to be turned so that the angle between the vertical plane passing through the primary axle 1 and the vertical wall of the step 5 increases (FIGS. 3 and 4). Since the angle $\alpha$ respectively $\alpha'$ between the primary axle 1 and the secondary axle 2 remains constant, the center of gravity T of the vehicle frame 4 starts to be lifted due to the turning of the secondary axle 2 around the primary axle 1. Due to this turning of the travel gear element 3, the contact point of the travel gear element 3 with the edge of the step 5 also changes, so that this contact point is shifted toward the smaller radius of the travel gear element 3, the distance y on the center of gravity T from the horizontal support increases, whereby the distance of the center of gravity T from the edge of the step 5 decreases.

In the course of the further movement of the travel gear element 3, in the equilibrium position, where the gear element 3 starts to travel on the horizontal part of the step 5, axle 2 starts to be raised. The travel gear element 3 thereby turns into its original position, so that the angle between the vertical plane passing through the primary axle 1 and the vertical wall of the step 5 decreases. In the course of this movement, the center of gravity T of the vehicle frame 4 is raised due to the raising of the travel gear element 3, so that simultaneously due to its return turning, the center of gravity T of the vehicle from 4 is lowered. Due to this combined movement, a relatively smaller raising of the center T of gravity of the vehicle frame with respect to the raising of the travel gear element 3 takes place than if the element 3 were mounted on an axle rigidly affixed to the vehicle.

When the diagram in FIG. 10 is analyzed, it can be seen from the curve a and from the contour of the track which the vehicle has to overcome, in the case given by the height of the step 5 and in the following horizontal plane, the sudden change of the height of the center of gravity T from the original horizontal support is prevented. The vehicle frame 4 starts to be raised upon contact with the obstacle by turning the travel gear element 3, whereby the travel gear element 3 still remains on the horizontal support in front of the obstacle. A shifting of the vehicle frame 4 in direction of movement of the vehicle takes place simultaneously. In the course of the proper passage of the travel gear element 3 over the obstacle, i.e. over the step 5 and its simultaneous turning back, a smaller raising of the center of gravity T of the vehicle frame 4 with respect to the raising of the travel gear element 3 takes place as stated earlier.

The primary axle 1 and the secondary axle 2 need not be concurrent; similar results with a suspension of a travel gear element 3 can also be obtained, for instance, by a skew arrangement of both axles. The angle between the primary axle 1 and the horizontal support is advantageously selected so as to be larger than the angle between the secondary axle 2 and the horizontal axle support, whereby the parimary axle 1 can be the driving axle of a power driven vehicle; as shown in the embodiment of FIG. 11 described below.

It will be apparent from the above that the axis of the secondary axle 2 is disposed at an acute angle with respect to a horizontal supporting plane, or with respect to a plane (FIGS. 1 and 4) perpendicular to such horizontal supporting plane and passing through the axis of the primary axle 1, (FIGS. 2 and 3) or simultaneously at an acute angle with respect to both the horizontal supporting plane and a plane perpendicular to such horizontal supporting plane passing through the axis of the primary axle 1. These conditions are novel with the present invention, and differentiate the suspension of the present invention from similar suspensions (suspensions for mobile seats, for example) wherein the secondary axle is perpendicular to a horizontal supporting plane or from a suspension wherein the secondary axle is simultaneously parallel with the horizontal supporting plane and with the longitudinal axis of the vehicle.

Figure 11:
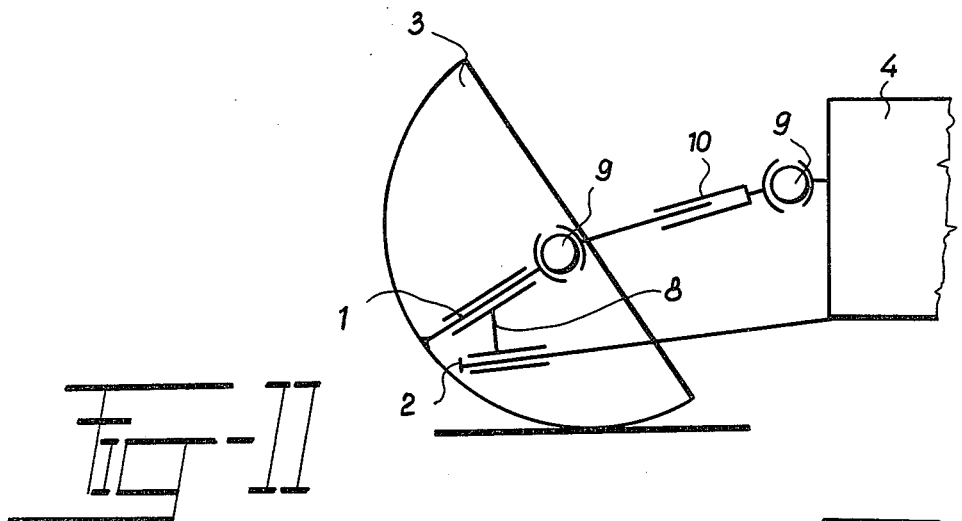
FIG. 11 is a view in side elevation diagrammatically illustrating a first embodiment of driving mechanism for a vehicle in accordance with the invention, such driving mechanism directly driving the primary axle.
Figure 12:
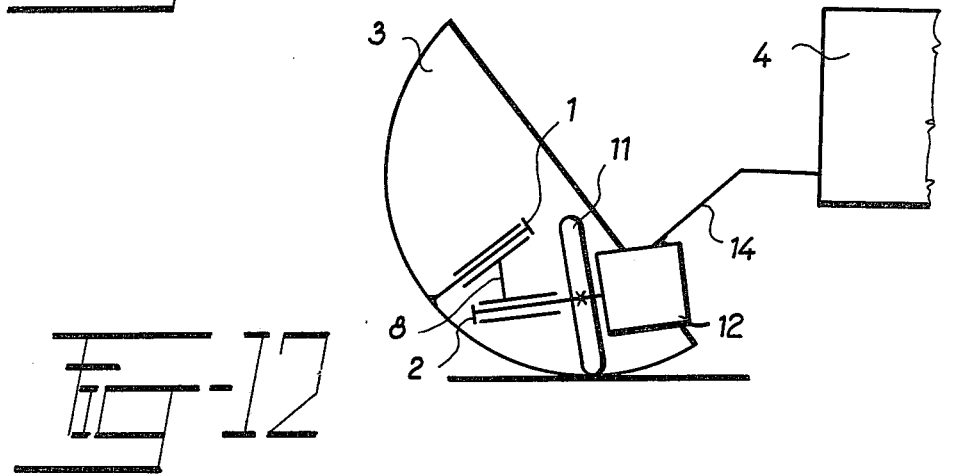
FIG. 12 is a view similar to FIG. 11 of a second embodiment of driving mechanism for a vehicle in accordance with the invention, such mechanism frictionally transmitting power from a prime mover to the internal surface of a travel gear element.
Figure 13:
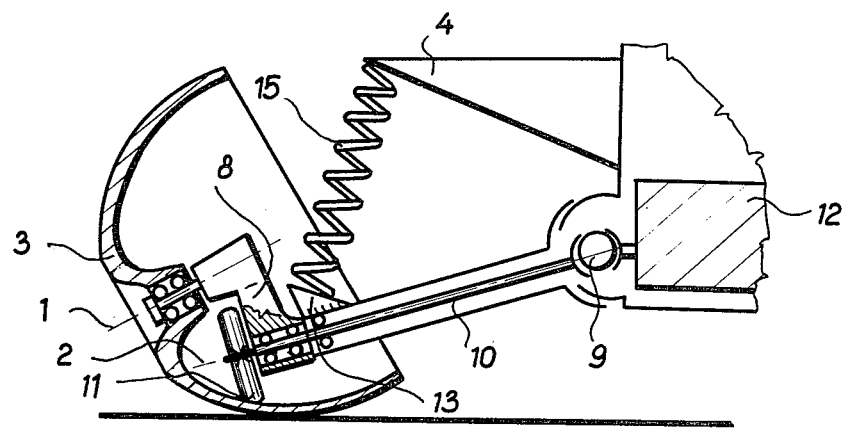
FIG. 13 is a view similar to FIGS. 11 and 12 of a third embodiment of driving mechanism for a vehicle in accordance with the invention, such mechanism having an oscillating arrangement of the secondary axle with respect to the vehicle frame.

Turning now to FIGS. 11, 12, and 13, it is possible to provide without further adjustments a driving motor, for instance on the secondary axle, to which the frame is firmly connected. The angle $\alpha$ between the primary axle 1 and the secondary axle 2 is constant and it is therefore possible to provide direct power transmission to the primary axle 1 (FIG. 11) or to provide a frictional transmission (FIGS. 12 and 13) between a driving wheel driven from a motor and the internal surface of a travel gear element. A resilient suspension (FIG. 13) of the travel gear on the vehicle frame is also possible, for instance by using joints or by the use of a rotatable arrangement and a resilient element as is commonly used with other vehicles, particularly motor vehicles. Another possibility (not shown) for driving the primary axle 1 is a flexible shaft connecting the primary axle 1 with the output shaft of the motor which, for example, is disposed on the vehicle frame.

In FIG. 11 there is schematically shown an arrangement wherein the motor (not shown) is disposed upon the vehicle frame 4. The output shaft of the motor is connected to the travel gear 3 through a first universal joint 9, a sliding joint 10, and a second universal joint 9.

In FIG. 12, a motor 12 is supported upon the frame 4 by a supporting arm 14. The output shaft of the motor 12, which is coaxial of the secondary axial 2, carries a friction wheel 11 fixedly mounted thereon. Such mounting permits the friction wheel 11 to remain constantly in contact with the inner surface of the travel element 3, despite rotation of the arm 8 about the primary axle 1. The supporting arm 14 may also be mounted for oscillation in a manner similar to the oscillating arm 13 in FIG. 13, to be described.

In FIG. 13, the output shaft of a motor 12 mounted on the frame 4 is connected through a universal joint 9 to a driving shaft 10. The driving shaft 10 is mounted coaxially within a tubular oscillating arm 13 which is mounted upon a part-spherical jointed structure which is coaxial of the universal joint 9. A friction wheel 11 is fixedly mounted upon the outer end of the driving shaft 10 and constantly engages the inner surface of the travel gear 3. A coil compression spring 15 extends between the outer end of the oscillating arm 13 and the frame 4 so as to cushion the mounting of the frame by such travel gear 3.

Figure 14:
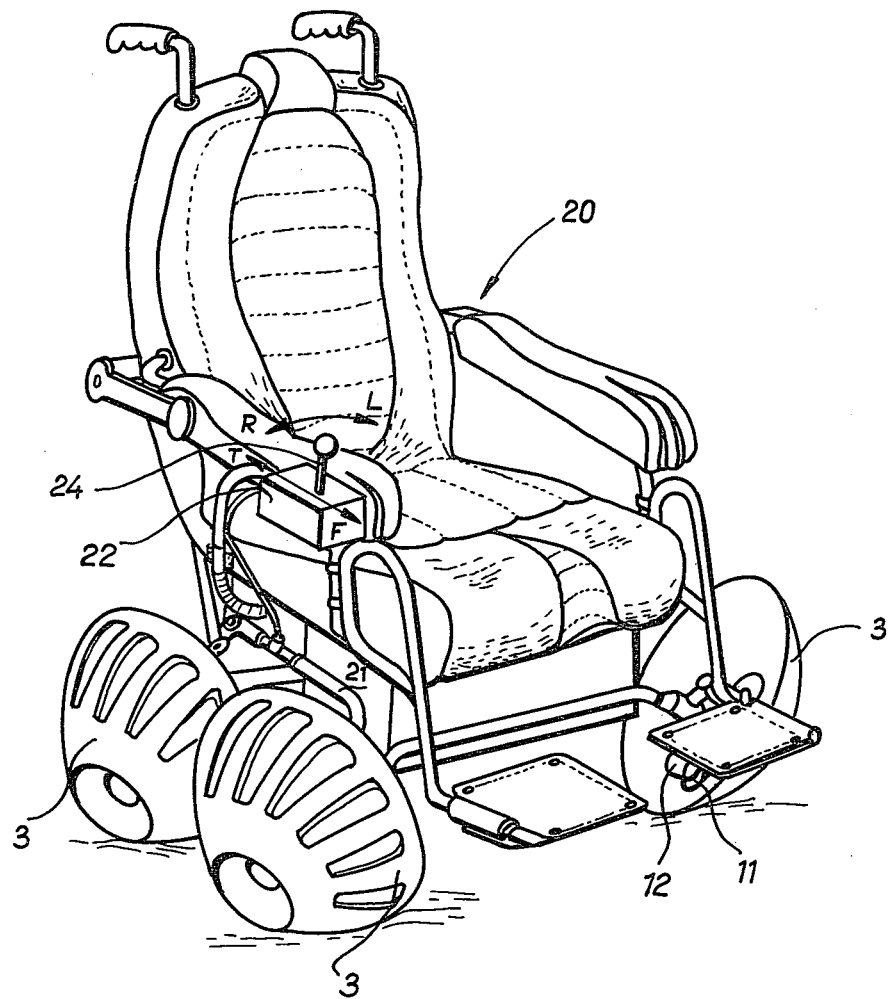
FIG. 14 is a view in perspective of a power driven wheelchair in accordance with the invention, such wheelchair incorporating the driving means illustrated in FIG. 12.

In FIG. 14 there is shown a wheel-chair 20 having four travel gear elements 3, and at least two opposite elements being power driven. In the manner shown in the embodiment of FIG. 12. The wheel-chair 20 has a battery (not shown) contained within a battery case 21, the battery being connected through a control device 22 to an electric motor 12 driving a friction wheel 11 disposed at at least two opposite (front or back) travel gear element 3. The control 22 has a universally moveable control lever 24, in a central, neutral position of lever 24 the motors 12 being at rest. Movement of lever 24 forwardly to a varying degree progressively drives the motors 12 at increasing speed in a forward direction; movement of the lever 24 rearwardly in a varying degree drives the motors 12 at a progressively higher speed in the reverse direction. Movement of the lever 24 to the right (FIG. 14) energizes only that motor or those motors at the right of the vehicle 20, and movement of the lever 24 to the left energizes only that motor or those motors disposed at the left of the vehicle, thereby permitting the vehicle to be steered.

Figure 15:
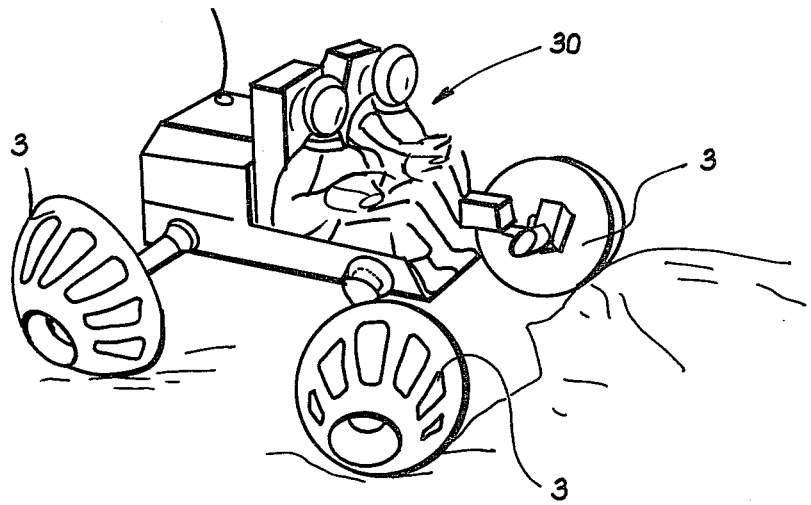
FIG. 15 is a view in perspective of a Jeep-type vehicle having a suspension and travel gear element driving mechanism in accordance with the invention.

In FIG. 15 there is disclosed a Jeep-type vehicle having four travel gear elements 3 at least two opposite ones of such elements being driven in the manner shown in any of FIGS. 11, 12, and 13.

Figure 16:
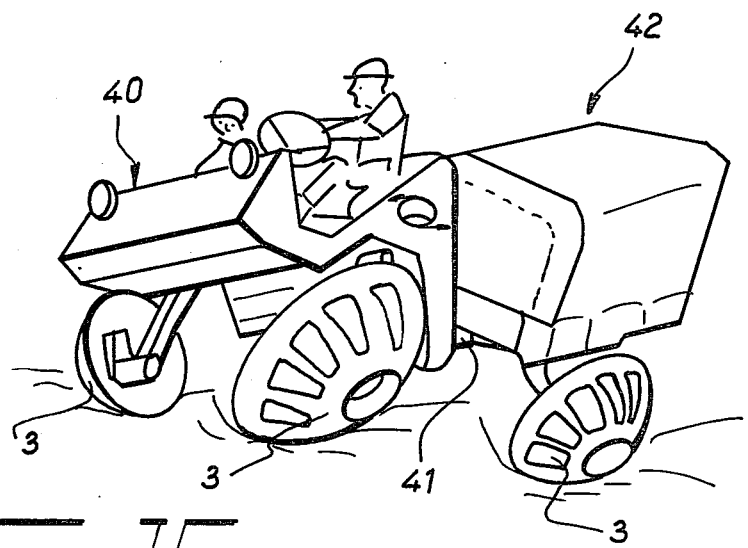
FIG. 16 is a view in perspective of a two-wheeled tractor coupled by a load-bearing articulated joint to a two-wheeled trailer having idle travel gear elements suspended in accordance with the invention.

In FIG. 16, there is disclosed a two-wheeled tractor 40 having its travel gear element 3 power driven in the manner shown in any one of FIGS. 11, 12, and 13. The tractor 40 is connected by a load-bearing articulated joint 41 to a two-wheeled trailer 42 the travel gear elements 3 of the trailer being idle and being suspended on the frame of the trailer in a manner shown in FIGS. 1 to 8 inclusive, on the one hand, or FIG. 9, on the other hand.

Although the invention is illustrated and described with reference to a plurality of preferred embodiments thereof, it is to be expressly understood that it is in no way limited to the disclosure of such preferred embodiments but is capable of numerous modifications within the scope of the appended claims.

We claim:

1. In a suspension of a travel gear for vehicles adapted to travel over rough terrain, the travel gear having the shape of a body of revolution and being supported on a primary axle and mounted for idle revolution about a secondary axle connected to a vehicle frame, the improvement wherein the angle $\alpha$ between the primary and secondary axles is less than 90°, and including a reference plane $\tau$ perpendicular to a horizontal support plane for said vehicle passing through the longitudinal axis thereof, at least one of said primary and secondary axles making an angle $\beta$ of less than 90° with said reference plane $\tau$.

2. A suspension of a travel gear element as in claim 1, wherein the angle between the secondary axle and the horizontal supporting plane is smaller than the angle between the primary axle and and the horizontal supporting plane, whereby the angle between the primary axle and the secondary axle measured from their crossing point in the direction toward the support for both axles is within the range 0°–45°.

3. A suspension of a travel gear element as claimed in claim 1, comprising means for driving the travel gear element about the primary axle, wherein the means for driving the travel gear element comprises a shaft and two universal driving joints.

4. A suspension of a travel gear element as claimed in claim 1, comprising means for driving the travel gear element about a primary axle, wherein the means for driving the travel gear element comprises a driving wheel rotationally supported on the secondary axle which latter is in a frictional engagement with the inner surface of said travel gear element.

* * * * *